(12) United States Patent
Kumar

(10) Patent No.: US 11,846,818 B2
(45) Date of Patent: Dec. 19, 2023

(54) HIGH DENSITY OPTICAL FIBER JOINT ENCLOSURE

(71) Applicant: Sterlite Technologies Limited, Aurangabad (IN)

(72) Inventor: Shantha Kumar, Aurangabad (IN)

( * ) Notice: Subject to any disclaimer, the term of this patent is extended or adjusted under 35 U.S.C. 154(b) by 0 days.

(21) Appl. No.: 17/256,020

(22) PCT Filed: May 4, 2020

(86) PCT No.: PCT/IN2020/050403
§ 371 (c)(1),
(2) Date: Dec. 24, 2020

(87) PCT Pub. No.: WO2020/225824
PCT Pub. Date: Nov. 12, 2020

(65) Prior Publication Data
US 2022/0050258 A1    Feb. 17, 2022

(30) Foreign Application Priority Data

May 7, 2019    (IN) .............................. 201921018261

(51) Int. Cl.
*G02B 6/44*    (2006.01)

(52) U.S. Cl.
CPC .......... *G02B 6/4442* (2013.01); *G02B 6/4455* (2013.01)

(58) Field of Classification Search
CPC .................................................. G02B 6/4442
See application file for complete search history.

(56) References Cited

U.S. PATENT DOCUMENTS

| | | | | |
|---|---|---|---|---|
| 5,734,776 A | * | 3/1998 | Puetz | G02B 6/4442 385/134 |
| 7,274,850 B2 | * | 9/2007 | Wittmeier | G02B 6/4445 385/135 |
| 2003/0223725 A1 | * | 12/2003 | Laporte | G02B 6/4442 385/135 |
| 2011/0058785 A1 | * | 3/2011 | Solheid | G02B 6/4452 385/135 |

FOREIGN PATENT DOCUMENTS

| | | | |
|---|---|---|---|
| GB | 2176024 A * | 12/1986 | ........... G02B 6/4441 |
| WO | WO-9630792 A2 * | 10/1996 | ........... G02B 6/4442 |
| WO | WO-2021152145 A1 * | 8/2021 | |

* cited by examiner

*Primary Examiner* — Eric Wong
(74) *Attorney, Agent, or Firm* — Steven R. Fairchild

(57) ABSTRACT

The present disclosure provides an optical fibre joint enclosure for providing housing to a plurality of optical fibres and a plurality of optical fibre cables. Further, the optical fibre joint enclosure includes a dome cover, a latch, a metal lock wire, a lock and a port assembly. Furthermore, the optical fibre joint enclosure includes a plurality of storage baskets. The plurality of storage baskets includes a first basket, a second basket and a third basket. The first basket is positioned on a first side inside the dome cover of the optical fibre joint enclosure. The second basket is positioned on a second side inside the dome cover of the optical fibre joint enclosure. The third basket is positioned in middle of the first basket and the second basket.

18 Claims, 27 Drawing Sheets

1000

1100

HIGH DENSITY OPTICAL FIBER JOINT ENCLOSURE

CROSS-REFERENCE TO RELATED APPLICATIONS

Not Applicable.

STATEMENT REGARDING FEDERALLY SPONSORED RESEARCH OR DEVELOPMENT

Not Applicable.

REFERENCE TO SEQUENCE LISTING, A TABLE, OR A COMPUTER PROGRAM LISTING COMPACT DISC APPENDIX

Not Applicable.

BACKGROUND OF THE INVENTION

Field of the Invention

The present disclosure relates to the field of optical fibre joint enclosure. More particularly, the present disclosure relates to compact high density optical fibre joint enclosure for providing housing to optical fibres and optical fibre cables.

Description of the Related Art

Over the last few years, there has been a significant rise in the use of optical fibre cables. The optical fibre cables are employed for a variety of applications. However, the optical fibre cables are primarily employed for networking and communication applications. In networking and communication applications, it is frequently desirable to make connections and provide protection to different pairs of optical fibres. A variety of equipment is used to make these connections and provide protection to different pairs of optical fibres. The variety of equipment includes an optical fibre joint enclosure box. The optical fibre joint enclosure box provides protection to fibre optic splices. In addition, the optical fibre joint enclosure box provides space for fibre optic cables to be spliced together. Further, the optical fibre joint enclosure box connects and stores optical fibres safely either in the outside plant or indoor buildings. Furthermore, the optical fibre joint enclosure box has a strong cover that protects internal assembly of the optical fibre joint enclosure box from hostile environment.

BRIEF SUMMARY OF THE INVENTION

The present disclosure provides an optical fibre joint enclosure. The optical fibre joint enclosure includes a base housing and a dome cover. The base housing has one of a cubical and cuboidal shape. The dome cover is mechanically engaged with the base housing. The base housing and the dome cover forms compact high density enclosure.

A primary object of the present disclosure is to provide an optical fibre joint enclosure for serving multiple functions.

Another object of the present disclosure is to provide the optical fibre joint enclosure with multiple splice trays.

Another object of the present disclosure is to provide the optical fibre joint enclosure to provide space for fibre optic cables to be spliced together.

Yet another object of the present disclosure is to provide the optical fibre joint enclosure with a plurality of ports.

Yet another object of the present disclosure is to provide the optical fibre enclosure that connects and stores optical fibres safely either in outside plant or indoor buildings.

In an embodiment of the present disclosure, the optical fibre joint enclosure further includes the dome cover. The dome cover is a lid of the optical fibre joint enclosure. The dome cover protects internal assembly of the optical fibre joint enclosure.

In an embodiment of the present disclosure, the optical fibre joint enclosure further includes a first basket, a second basket and a third basket. The first basket is positioned perpendicular to the base housing and parallel to a central axis of the optical fibre joint enclosure. The first basket stores the plurality of optical fibres. The second basket is positioned perpendicular to the base housing and parallel to the central axis of the optical fibre joint enclosure. The second basket is positioned on an opposite side to the first basket. The second basket stores the plurality of optical fibres. The third basket is a mid-span basket. The third basket is positioned perpendicular to the base housing and parallel to the central axis of the optical fibre joint enclosure. The third basket is positioned in middle of the first basket and the second basket. The first basket, the second basket and the third basket are parallel to edges of the optical fibre joint enclosure.

In an embodiment of the present disclosure, the optical fibre joint enclosure further includes a plurality of splice trays.

In an embodiment of the present disclosure, the optical fibre joint enclosure further includes a plurality of splice trays. Each of the plurality of splice trays is mounted on a mounting tray. Each of the plurality of splice trays includes a splice holder cover and a plurality of splice holder slots.

In an embodiment of the present disclosure, the optical fibre joint enclosure further includes a latch, a metal lock wire, a lock and a port assembly. The latch connects the dome cover with the port assembly. The metal lock wire and the lock are utilized for locking the dome cover with the port assembly.

In an embodiment of the present disclosure, the optical fibre joint enclosure further includes a port assembly. The port assembly includes a plurality of ports. The plurality of ports include a plurality of drop cable ports (112), a plurality of primary ports, a mid span port, an earthing port and an air valve. The plurality of drop cable ports is utilized to connect one or more secondary optical fibre cables with the optical fibre joint enclosure. The plurality of primary ports is utilized for connecting a first primary optical fibre cable with the optical fibre joint enclosure. A number of the plurality of primary ports is 2. The mid span port is utilized for connecting one or more second primary optical fibre cables with the optical fibre joint enclosure. The earthing port is utilized for connecting earth wire with the optical fibre joint enclosure. The air valve facilitates air circulation in the optical fibre joint enclosure.

In an embodiment of the present disclosure, the optical fibre joint enclosure further includes at least one of a plurality of drop cable ports and a plurality of storage baskets. A number of the plurality of drop cable ports is 6. The plurality of storage baskets has capacity to store 1152 optical fibres. The optical fibre joint enclosure has splicing capacity of 2592 splices.

In an embodiment of the present disclosure, the optical fibre joint enclosure is defined by a height (h) of 500 to 600 millimeters and a width (w) of 200 to 300 millimeters.

In another aspect, the present disclosure provides an optical fibre joint enclosure. The optical fibre joint enclosure includes a plurality of storage baskets. Each of the plurality of storage baskets is positioned inside a dome cover. The plurality of storage baskets includes a first basket, a second basket and a third basket. The first basket is positioned perpendicular to the base housing and parallel to a central axis of the optical fibre joint enclosure. The first basket stores the plurality of optical fibres. The second basket is positioned perpendicular to the base housing and parallel to the central axis of the optical fibre joint enclosure. The second basket is positioned on an opposite side to the first basket. The second basket stores the plurality of optical fibres. The third basket is a mid-span basket. The third basket is positioned perpendicular to the base housing and parallel to the central axis of the optical fibre joint enclosure. The third basket is positioned in middle of the first basket and the second basket. The first basket, the second basket and the third basket are parallel to edges of the optical fibre joint enclosure.

In an embodiment of the present disclosure, the optical fibre joint enclosure further includes a base housing. The base housing has one of a cubical and cuboidal shape.

In an embodiment of the present disclosure, the optical fibre joint enclosure further includes a dome cover mechanically engaged with a base housing. The dome cover is a lid of the optical fibre joint enclosure. The dome cover protects internal assembly of the optical fibre joint enclosure. The base housing and the dome cover forms compact high density enclosure.

In an embodiment of the present disclosure, the optical fibre joint enclosure has a rectangular shape. The optical fibre joint enclosure is a compact high density enclosure.

In an embodiment of the present disclosure, the optical fibre joint enclosure further includes a plurality of splice trays.

In an embodiment of the present disclosure, the optical fibre joint enclosure further includes a plurality of splice trays. Each of the plurality of splice trays is mounted on a mounting tray. Each of the plurality of splice trays includes a splice holder cover and a plurality of splice holder slots.

In an embodiment of the present disclosure, the optical fibre joint enclosure further includes a latch, a metal lock wire, a lock and a port assembly. The latch connects the dome cover with the port assembly. The metal lock wire and the lock are utilized for locking the dome cover with the port assembly.

In an embodiment of the present disclosure, the optical fibre joint enclosure further includes a port assembly. The port assembly includes a plurality of ports. The plurality of ports include a plurality of drop cable ports, a plurality of primary ports, a mid span port, an earthing port and an air valve. The plurality of drop cable ports is utilized to connect one or more secondary optical fibre cables with the optical fibre joint enclosure. The plurality of primary ports is utilized for connecting a first primary optical fibre cable with the optical fibre joint enclosure. A number of the plurality of primary ports is 2. The mid span port is utilized for connecting one or more second primary optical fibre cables with the optical fibre joint enclosure. The earthing port is utilized for connecting earth wire with the optical fibre joint enclosure. The air valve facilitates air circulation in the optical fibre joint enclosure.

In an embodiment of the present disclosure, the optical fibre joint enclosure further includes at least one of a plurality of drop cable ports and a plurality of storage baskets. A number of the plurality of drop cable ports is 6. The plurality of storage baskets has capacity to store 1152 optical fibres. The optical fibre joint enclosure has splicing capacity of 2592 splices.

In an embodiment of the present disclosure, the optical fibre joint enclosure is defined by a height (h) of 500 to 600 millimeters and a width (w) of 200 to 300 millimeters.

DESCRIPTION OF THE DRAWINGS

In order to best describe the manner in which the above-described embodiments are implemented, as well as define other advantages and features of the disclosure, a more particular description is provided below and is illustrated in the appended drawings. Understanding that these drawings depict only exemplary embodiments of the invention and are not therefore to be considered to be limiting in scope, the examples will be described and explained with additional specificity and detail through the use of the accompanying drawings in which.

Figure 1:
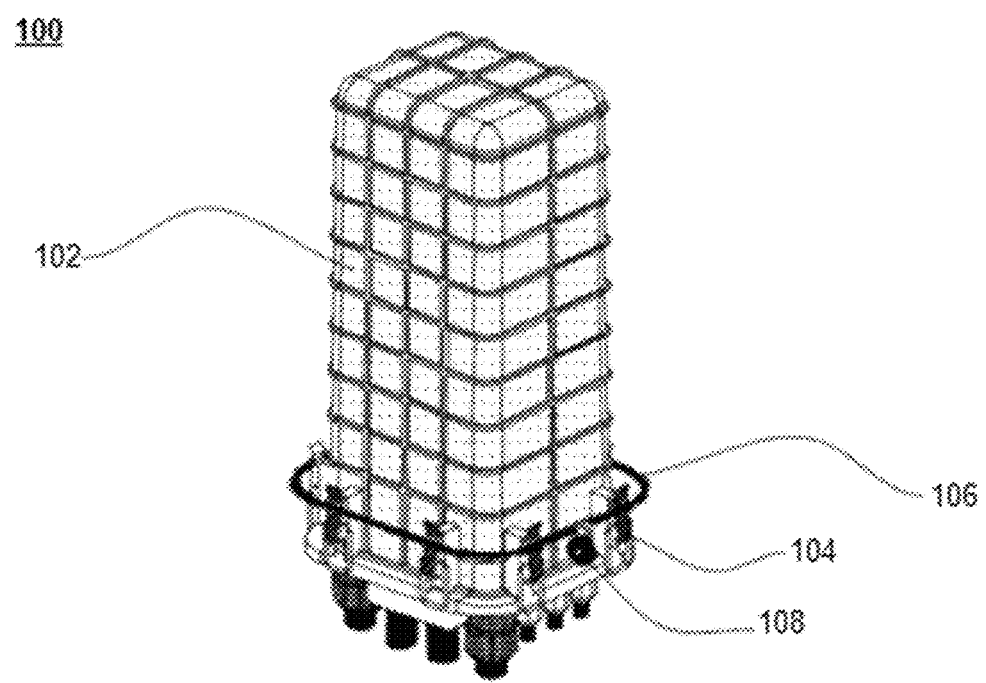
FIG. 1 and FIG. 2 illustrates a three dimensional external view of an optical fibre joint enclosure, in accordance with an embodiment of the present disclosure.

It should be noted that the accompanying figures are intended to present illustrations of few exemplary embodiments of the present disclosure. These figures are not intended to limit the scope of the present disclosure. It should also be noted that accompanying figures are not necessarily drawn to scale.

REFERENCE NUMERALS IN THE DRAWINGS

For a more complete understanding of the present invention parts, reference is now made to the following descriptions:

100. Optical fibre joint enclosure.
102. Dome cover.
104. Latch.
106. Metal lock wire.
108. Lock.
110. Base housing.
112. Plurality of drop cable ports.
114. Plurality of primary ports.
116. Mid span port.
118. Earthing port.
120. Air valve.
122. Latch lock plate.
124. Port assembly.
200. Three dimensional internal view.
202. The first basket.
204. The second basket.
206. The third basket.
214. Plurality of splice trays.
400. Internal cross-sectional view.
500. Cross-sectional view.
502. Splice tray.
504. Plurality of splice holder slots.
506. Includes a splice holder cover.
600. Close view.
602. Chassis.
604. Cable bracket.
606. Gasket.
608. FRP small screw holder.
610. FRP big screw holder.
612. Small screw cable clamp.
614. Big screw cable clamp.
700. Side view.
900. Side view.
902. Nut plastic case.
904. Rubber seal.
906. Pressure plate.
908. Sealing cap.
910. Nut case.
912. Seal.
914. Plate.
916. Cap.
918. Mid span rubber.
920. Mid span cap.
922. Socket.
924. Brass insert.
1000. Multiple components.
l. Length.
h. High.
w. Width.

DETAILED DESCRIPTION OF THE INVENTION

The following detailed description is of the best currently contemplated modes of carrying out exemplary embodiments of the invention. The description is not to be taken in a limiting sense, but is made merely for the purpose of illustrating the general principles of the invention.

Reference in this specification to "one embodiment" or "an embodiment" means that a particular feature, structure, or characteristic described in connection with the embodiment is included in at least one embodiment of the present technology. The appearance of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

Reference will now be made in detail to selected embodiments of the present disclosure in conjunction with accompanying figures. The embodiments described herein are not intended to limit the scope of the disclosure, and the present disclosure should not be construed as limited to the embodiments described. This disclosure may be embodied in different forms without departing from the scope and spirit of the disclosure. It should be understood that the accompanying figures are intended and provided to illustrate embodiments of the disclosure described below and are not necessarily drawn to scale. In the drawings, like numbers refer to like elements throughout, and thicknesses and dimensions of some components may be exaggerated for providing better clarity and ease of understanding.

Moreover, although the following description contains many specifics for the purposes of illustration, anyone skilled in the art will appreciate that many variations and/or alterations to said details are within the scope of the present technology. Similarly, although many of the features of the present technology are described in terms of each other, or in conjunction with each other, one skilled in the art will appreciate that many of these features can be provided independently of other features. Accordingly, this description of the present technology is set forth without any loss of generality to, and without imposing limitations upon, the present technology.

It should be noted that the terms "first", "second", and the like, herein do not denote any order, ranking, quantity, or importance, but rather are used to distinguish one element from another. Further, the terms "a" and "an" herein do not denote a limitation of quantity, but rather denote the presence of at least one of the referenced item.

Figure 2:
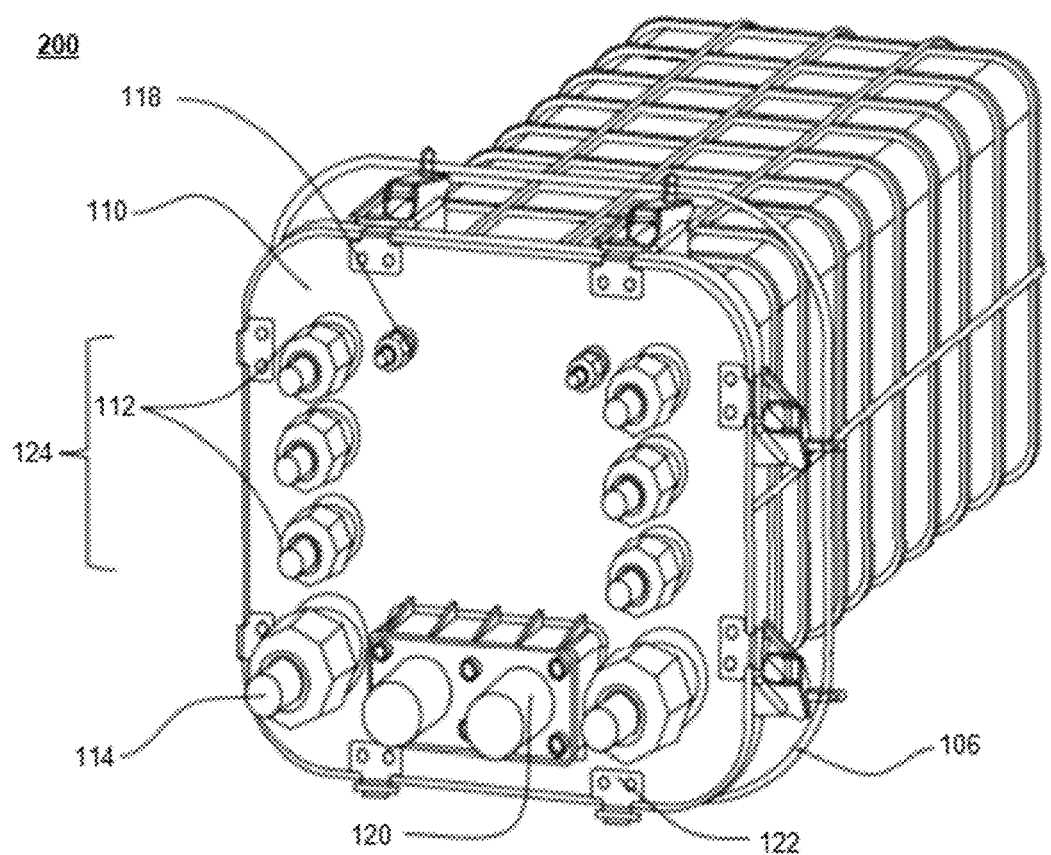
Figure 3:
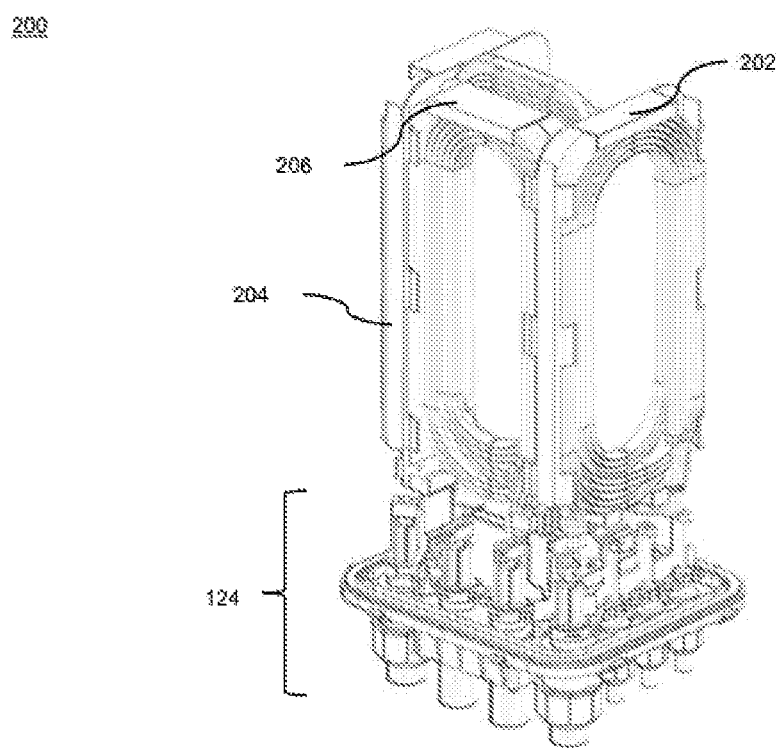
FIG. 3 and FIG. 4 illustrates a three dimensional internal view of the optical fibre joint enclosure of FIG. 1, in accordance with an embodiment of the present disclosure.
Figure 4:
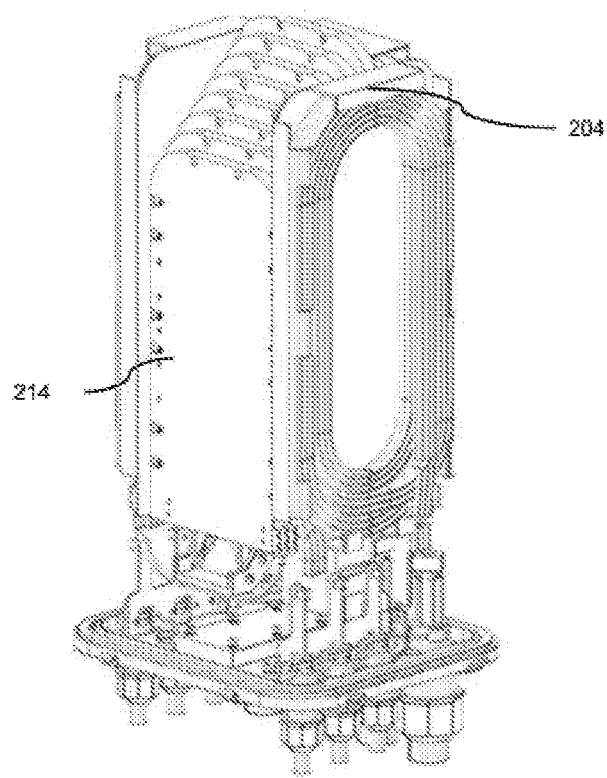

FIG. 1 and FIG. 2 illustrate a three dimensional external view of an optical fibre joint enclosure 100, in accordance with an embodiment of the present disclosure. FIG. 3 and FIG. 4 illustrate a three dimensional internal view 200 of the optical fibre joint enclosure 100 of FIG. 1, in accordance with an embodiment of the present disclosure. In general, optical fibre joint enclosures are used to provide space for fibre optic cables to be spliced together. In addition, the optical fibre joint enclosure 100 provides protection for optical fibre joints as optical fibre joint enclosures have high mechanical strength.

In an embodiment of the present disclosure, the optical fibre joint enclosure 100 is configured to be mounted on a wall, a pole, a tree or on any other suitable fixture of the like. In addition, the optical fibre joint enclosure 100 is a structure for housing and joining a plurality of optical fibre cables. Further, the optical fibre joint enclosure 100 stores a plurality of optical fibres. Furthermore, optical fibre joint enclosure 100 is used to store ends of the plurality of optical fibre cables. In general, optical fibre cable is an assembly containing one or more optical fibres that are used to carry light. The optical fibre cable is used for different applications. The different applications include long distance telecommunication, data transmission, and providing a high-speed data connection and the like. In an embodiment of the present disclosure, shape of the optical fibre joint enclosure 100 is rectangular. In another embodiment of the present disclosure, shape of the optical fibre joint enclosure 100 is cylindrical. In yet another embodiment of the present disclosure, shape of the optical fibre joint enclosure 100 may vary. The optical fibre joint enclosure 100 is a compact high density enclosure.

Further, the optical fibre joint enclosure 100 includes a dome cover 102 and a base housing 110. In addition, the optical fibre joint enclosure 100 includes a latch 104, a metal lock wire 106, a lock 108, a port assembly 124 (as shown in FIG. 1 and FIG. 2). In addition, the optical fibre joint enclosure 100 includes a plurality of storage baskets. The plurality of storage baskets includes a first basket 202, a second basket 204, a third basket 206 and a plurality of splice trays 214 (as shown in FIG. 3 and FIG. 4).

The optical fibre joint enclosure 100 includes the dome cover 102. The dome cover 102 is mechanically engaged with the base housing 110. The base housing 110 and the dome cover 102 forms compact high density enclosure. In an embodiment of the present disclosure, the dome cover 102 is a lid of the optical fibre joint enclosure 100. In an example, the dome cover 102 is a cover of the optical fibre joint enclosure 100. The dome cover 102 protects internal assembly of the optical fibre joint enclosure 100. In addition, the dome cover 102 provides protection to the optical fibre joint enclosure 100 from environmental conditions. The environmental conditions include but may not be limited to wind, rainfall, storm and sun light.

The optical fibre joint enclosure 100 includes the latch 104. In general, latch is a type of mechanical fastener that joins two or more objects or surfaces while allowing for regular separation. In an embodiment of the present disclosure, the latch 104 is used to connect the dome cover 102 with the port assembly 124.

The optical fibre joint enclosure 100 includes the metal lock wire 106. In addition, the optical fibre joint enclosure 100 includes the lock 108. In an embodiment of the present disclosure, the metal lock wire 106 and the lock 108 are used to lock the dome cover 102 with the port assembly 124. The metal lock wire 106 and the lock 108 are used to securely fasten the dome cover 102 with the port assembly 124.

Figure 5:
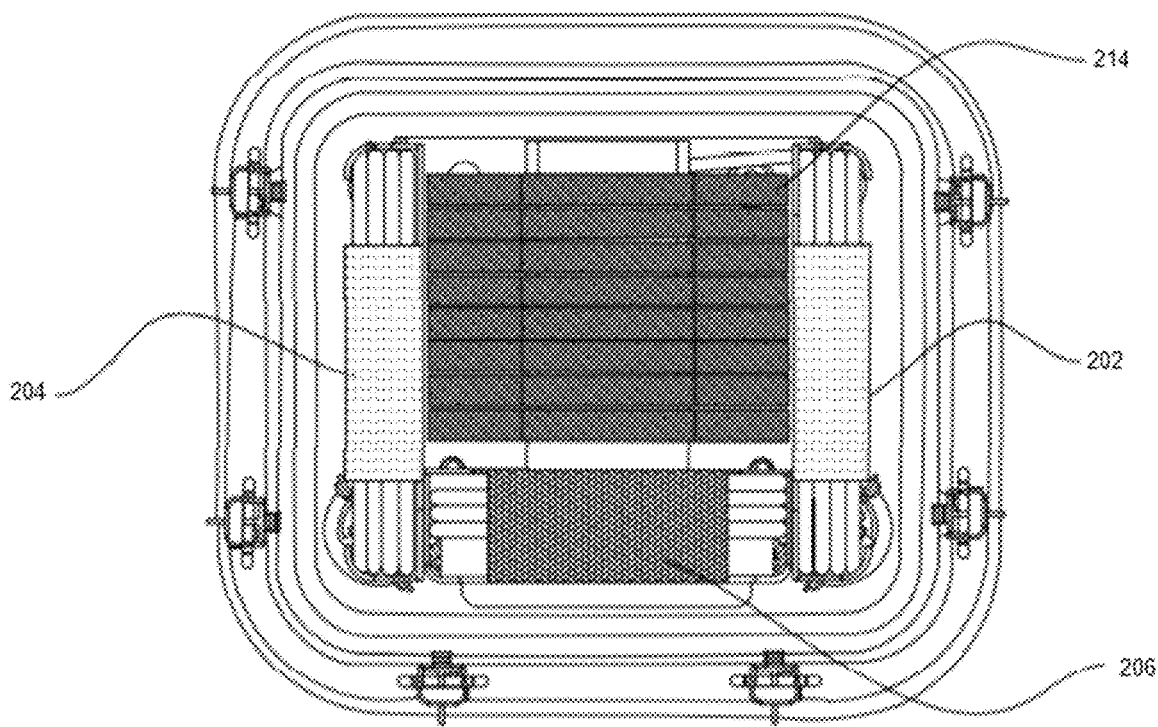
FIG. 5 illustrates an internal view of a port assembly of the optical fibre joint enclosure of FIG. 1, in accordance with an embodiment of the present disclosure.

Further, the optical fibre joint enclosure 100 includes the base housing 110. The base housing 110 has one of a cubical shape or a cuboidal shape. The base housing 110 forms a base of the optical fibre joint enclosure 100 over which the dome cover 102 and the plurality of storage baskets are positioned. Further, the port assembly 124 includes a plurality of ports. (as shown in FIG. 5) In an embodiment of the present disclosure, the dome cover 102 of the optical fibre joint enclosure 100 is attached to the base housing 110 with the help of one or more hinges. The plurality of ports includes a plurality of drop cable ports 112. In an embodiment of the present disclosure, number of the plurality of drop cable ports 112 in the port assembly 124 is 6. In another embodiment of the present disclosure, number of the plurality of drop cable ports 112 in the port assembly 124 may vary. The plurality of drop cable ports 112 is used to connect one or more secondary optical fibre cables with the optical fibre joint enclosure 100. Further, each of the one or more secondary optical fibre cables is an optical fibre cable having 432 fibres. In an embodiment of the present disclosure, number of fibres in the secondary optical fibre cable may vary. In an embodiment of the present disclosure, each of the plurality of drop cable ports 112 has diameter of 14 micrometer. In another embodiment of the present disclosure, diameter of each of the plurality of drop cable ports 112 may vary.

The plurality of ports includes a plurality of primary ports 114. In an embodiment of the present disclosure, number of the plurality of primary ports 114 is 2. In another embodiment of the present disclosure, number of the plurality of primary ports 114 may vary. The plurality of primary ports 114 is used to connect a first primary optical fibre cable with the optical fibre joint enclosure 100. Further, the first primary optical fibre cable is an optical fibre cable having 1152 fibres. In an embodiment of the present disclosure, number of fibres in the first primary optical fibre cable may vary. In an embodiment of the present disclosure, each of the plurality of primary ports 114 has diameter of 33 micrometer. In another embodiment of the present disclosure, diameter of each of the plurality of primary ports 114 may vary.

The plurality of ports includes a mid span port 116. In an embodiment of the present disclosure, the plurality of ports includes any number of the mid span port 116. The mid span port 116 is used to connect one or more second primary optical fibre cables with the optical fibre joint enclosure 100. Further, each of the one or more second primary optical fibre cables is an optical fibre cable having 1152 fibres. In an embodiment of the present disclosure, number of fibres in the one or more second primary optical fibre cables may vary. In an embodiment of the present disclosure, the mid span port 116 has diameter of 33 micrometer. In another embodiment of the present disclosure, diameter of the mid span port 116 may vary. In an embodiment of the present disclosure, the first primary optical fibre cable and the one or more second primary optical fibre cables is similar in construction. In another embodiment of the present disclosure, the first primary optical fibre cable and the one or more second primary optical fibre cables is different in construction.

Further, the plurality of ports includes an earthing port 118. The earthing port 118 is used to connect earth wire with the optical fibre joint enclosure 100. In general, earthing is used for protection against an electrical shock. In general, earth wire gives a safe route for current if live wire touches outer casing. Furthermore, the plurality of ports includes an air valve 120. The air valve 120 facilitates air circulation in the optical fibre joint enclosure 100. The port assembly 124 includes a latch lock plate 122. The latch lock plate 122 is used to connect the latch 104 with the base housing 110.

The optical fibre joint enclosure 100 includes the plurality of storage baskets. In addition, each of the plurality of storage baskets is positioned inside the dome cover 102. Further, the plurality of storage baskets includes the first basket 202, the second basket 204 and the third basket 206. The first basket 202 is positioned perpendicular to the base housing 110 and parallel to a central axis of the optical fibre joint enclosure 100. The second basket 204 is positioned perpendicular to the base housing 110 and parallel to the central axis of the optical fibre joint enclosure 100. The second basket 204 is positioned on an opposite side to the first basket 202. The second basket 204 stores the plurality of optical fibres. The third basket 206 is a mid-span basket. The third basket 206 is positioned perpendicular to the base housing 110 and parallel to the central axis of the optical fibre joint enclosure 100. The third basket 206 is positioned in middle of the first basket 202 and the second basket 204. The first basket 202 is used to store the plurality of optical fibres. The first basket 202, the second basket 204 and the third basket 206 of the plurality of storage baskets are positioned parallel to edges of the optical fibre joint enclosure 100. In an embodiment of the present disclosure, the first basket 202 has a storage capacity of 1152 optical fibres. In another embodiment of the present disclosure, the storage capacity of the first basket 202 may vary. The second basket 204 is used to store the plurality of optical fibres. In an embodiment of the present disclosure, the second basket 204 has a storage capacity of 1152 optical fibres. In another embodiment of the present disclosure, the storage capacity of the second basket 204 may vary. In an example, the first basket 202 and the second basket 204 stores incoming optical fibre cables. In an embodiment of the present disclosure, the third basket 206 is positioned in the middle of the first basket 202 and the second basket 204. Further, the third basket 206 lies at equidistant from the first basket 202 and the second basket 204. In other words, the third basket 206 is positioned in between the first basket 202 and the second basket 204 inside the dome cover 102 of the optical fibre joint enclosure 100. However, the third basket 206 may be positioned at any other position inside the dome cover 102 of the optical fibre joint enclosure 100.

In an embodiment of the present disclosure, the first basket 202, the second basket 204 and the third basket 206 are arranged vertically inside the optical fibre joint enclosure 100. The first basket 202, the second basket 204 and the third basket 206 are parallel to edges of the optical fibre joint enclosure 100. In addition, parallel arrangement of the first basket 202, the second basket 204 and the third basket 206 makes U-shape inside the optical fibre joint enclosure 100. The first basket 202 and the second basket 204 are support structures for the plurality of optical fibres and the plurality of optical fibre cables. In an embodiment of the present disclosure, the first basket 202 and the second basket 204 are used to store open ends of the plurality of optical fibre cables. In an example, a fibre cable of length five meter is withdrawn from the optical fibre joint enclosure 100. In addition, three meter of the fibre cable out of five meter is utilized. Further, remaining two meter of the fibre cable is inserted in one of the first basket 202 or the second basket 204. In other words, one of the first basket 202 or the second basket 204 is utilized to store the remaining two meter of the fibre cable. In addition, the third basket 206 is a mid-span basket. In an embodiment of the present disclosure, the third basket 206 lies at equidistant from the first basket 202 and the second basket 204. Further, the first basket 202, the second basket 204 and the third basket 206 are arranged inside the optical fibre joint enclosure 100 in an inline manner with the plurality of ports.

Figure 6:
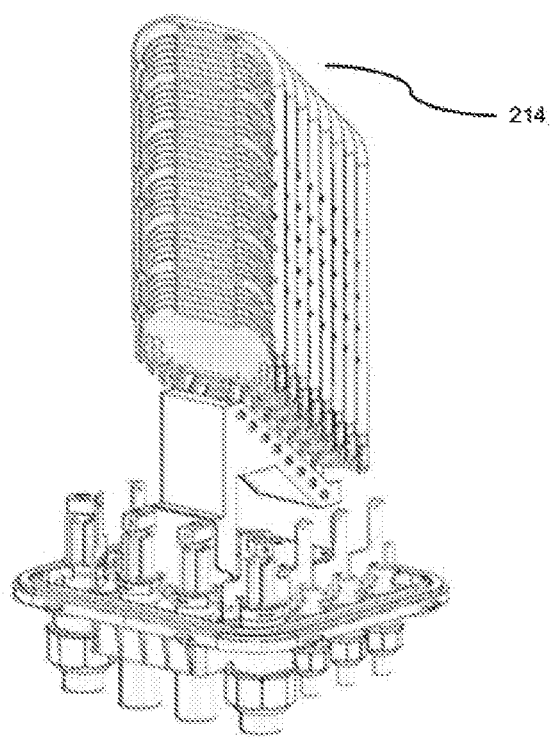
FIG. 6 illustrates a cross-sectional view of a plurality of splice trays inside the optical fibre joint enclosure of FIG. 1, in accordance with an embodiment of the present disclosure.

FIG. 6 illustrates an internal cross-sectional view 400 of the plurality of splice trays 214 inside the optical fibre joint enclosure 100 of FIG. 1, in accordance with an embodiment of the present disclosure. In general, splice trays provide safe routing and easy-to-manage environment for fragile optical fibre splices. In addition, splice trays are used to hold and protect individual optical fibre splices. In general, optical fibre splices are of two types. The two types of optical fibre splices include fusion splices and mechanical splices. In general, splice trays for fusion splices and mechanical splices are not same.

Each of the plurality of splice trays 214 is fixed inside the optical fibre joint enclosure 100. In an embodiment of the present disclosure, each of the plurality of splice trays 214 is mounted on a mounting tray. In addition, each of the plurality of splice trays 214 includes a splice holder cover 506 and a plurality of splice holder slots 504. Further, each of the plurality of splice trays 214 holds and protects individual spliced optical fibres inside the optical fibre joint enclosure 100. Furthermore, each of the plurality of splice trays 214 prevents the plurality of optical fibres and the optical fibre cables from unwanted displacement and distortion. Moreover, the plurality of splice trays 214 prevents the plurality of optical fibres and the plurality of optical fibre cables from damage. Also, the plurality of splice trays 214 is necessary to hold and protect individual fusion splices or mechanical splices. In an embodiment of the present disclosure, the optical fibre joint enclosure 100 has splicing capacity of 2592 splices. In another embodiment of the present disclosure, splicing capacity of the optical fibre joint enclosure 100 may vary.

Figure 7:
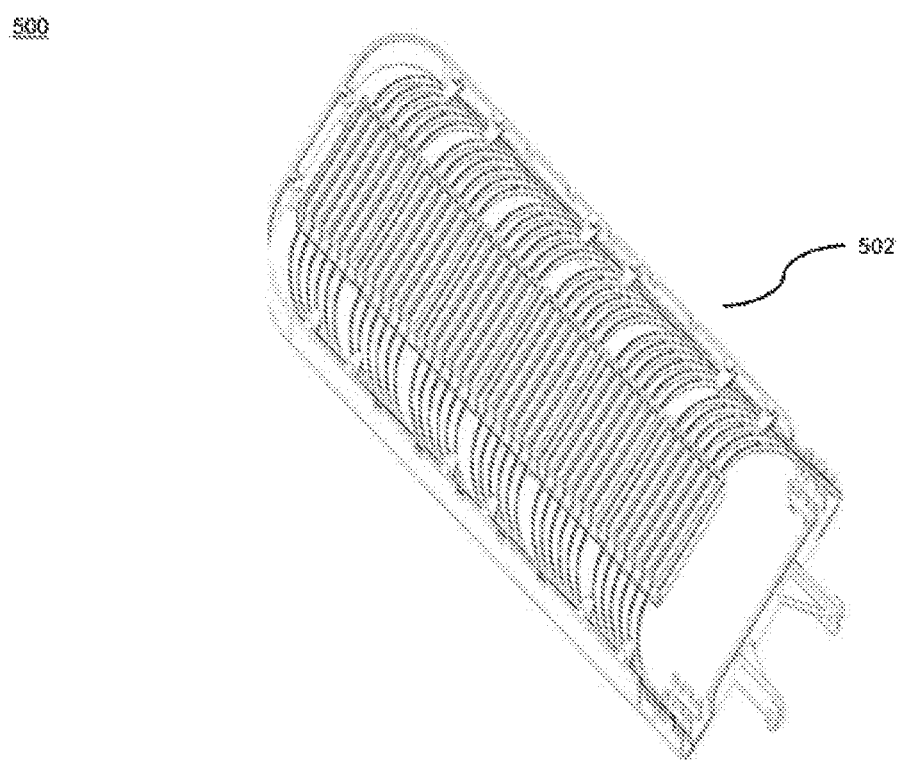
FIG. 7 illustrates a cross-sectional view of a splice tray of the plurality of splice trays inside the optical fibre joint enclosure of FIG. 1, in accordance with an embodiment of the present disclosure.
Figure 8:
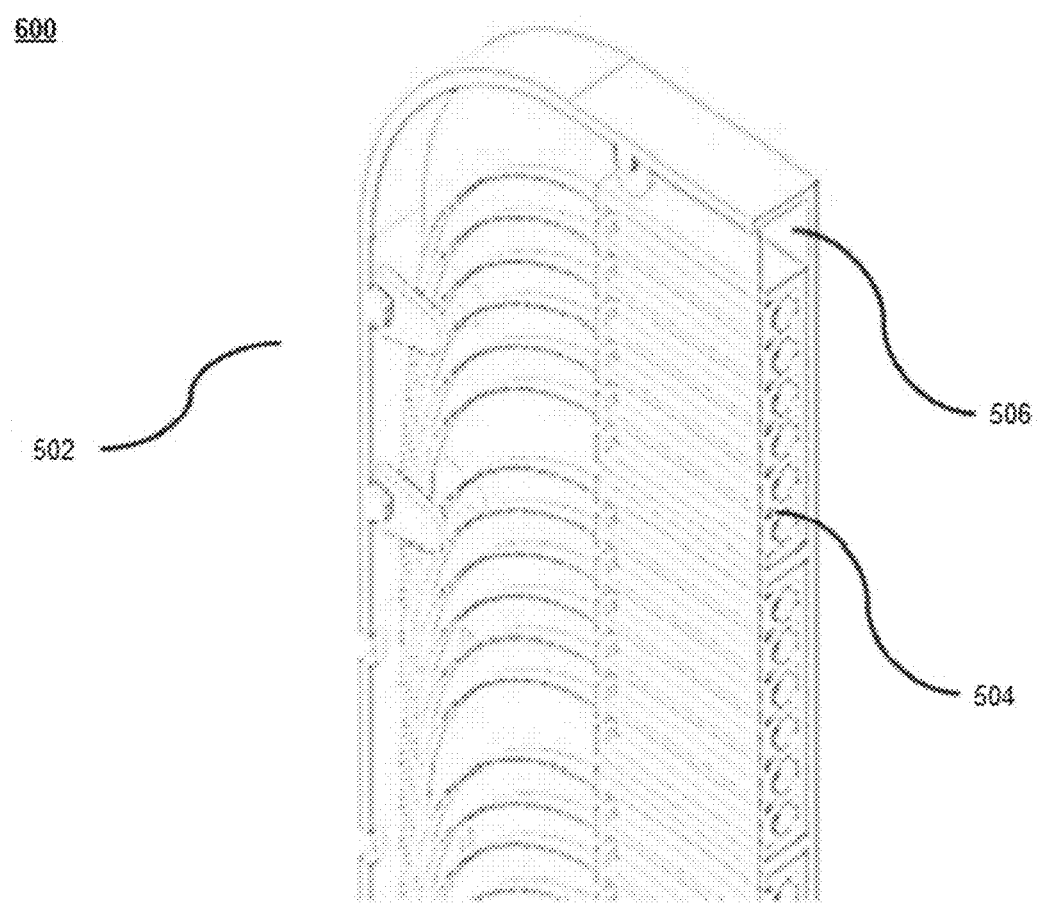
FIG. 8 illustrates a close view of the splice tray of the plurality of trays, in accordance with an embodiment of the present disclosure.

FIG. 7 illustrates a cross-sectional view 500 of a splice tray 502 of the plurality of splice trays 214 inside the optical fibre joint enclosure 100, in accordance with an embodiment of the present disclosure. FIG. 8 illustrates a close view 600 of the splice tray 502 of the plurality of trays 214, in accordance with an embodiment of the present disclosure. In an embodiment of the present disclosure, the splice tray 502 of the plurality of splice trays 214 includes the plurality of splice holder slots 504 and the splice holder cover 506. The plurality of splice holder slots 504 are used to hold a plurality of splice holders. The plurality of splice holders are employed to hold different fibre splices systematically.

Figure 9:
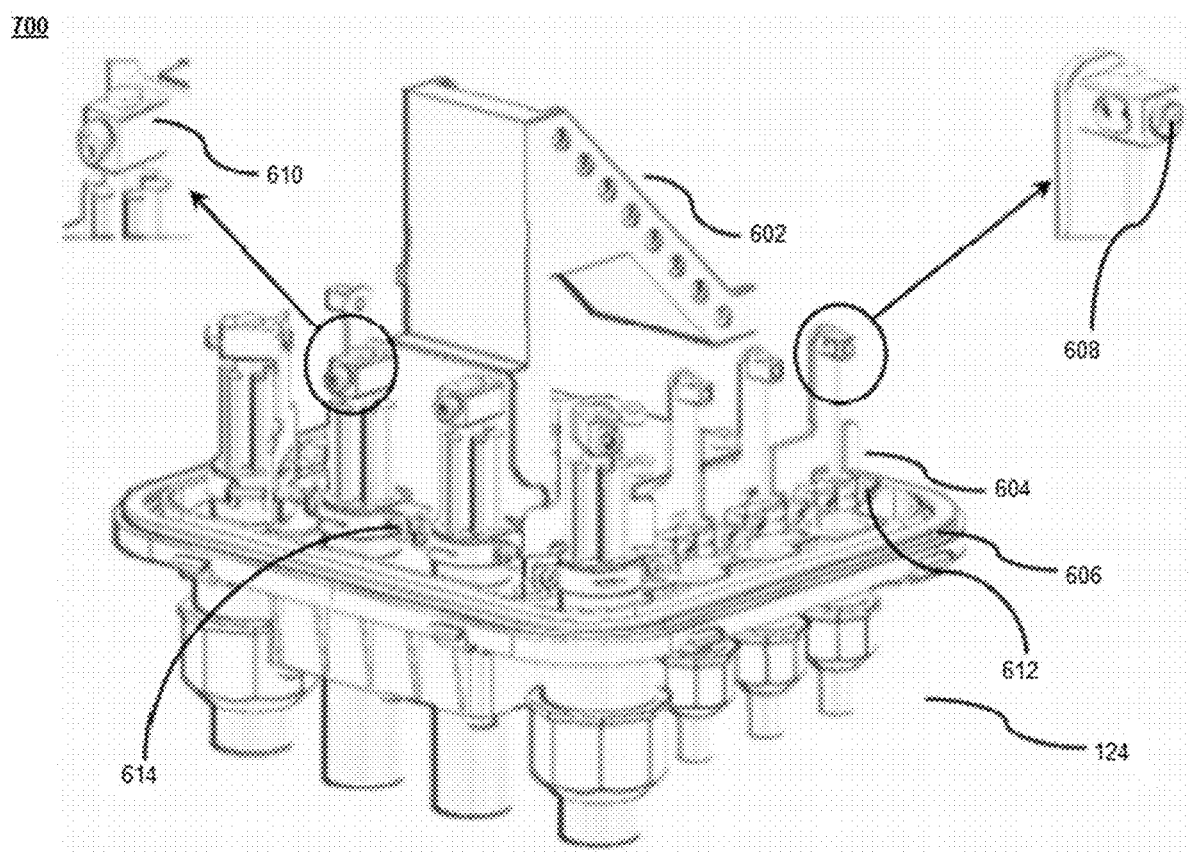
FIG. 9 illustrates a cross-sectional view of the port assembly of the optical fibre joint enclosure of FIG. 1, in accordance with an embodiment of the present disclosure.

FIG. 9 illustrates a cross-sectional view 900 of the port assembly 124 of the optical fibre joint enclosure 100 of FIG. 1, in accordance with an embodiment of the present disclosure. The port assembly 124 includes a chassis 602. The chassis 602 is used to hold the plurality of splice trays 214. In addition, the port assembly 124 includes a cable bracket 604. The cable bracket 604 is used to hold the plurality of optical fibre cables. In addition, the cable bracket 604 is made of corrosion resistant sheet metal stainless steel. The cable bracket 604 includes five vertical arms catering provision to hold one or more cable clamps. Further, the port assembly 124 includes a gasket 606, FRP small screw holder 608 and FRP big screw holder 610.

Figure 10:
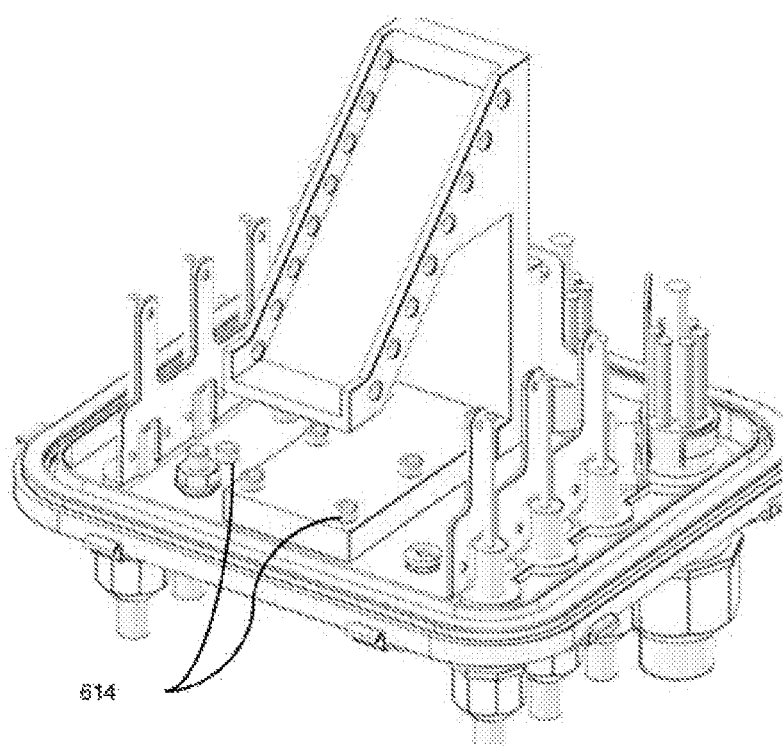
FIG. 10 illustrates a side view of the port assembly of the optical fibre joint enclosure of FIG. 1, in accordance with an embodiment of the present disclosure.

FIG. 10 illustrates a side view 700 of the port assembly 124 of the optical fibre joint enclosure 100 of FIG. 1, in accordance with an embodiment of the present disclosure. The port assembly 124 includes a plurality of socket headed screws 616. The plurality of socket headed screws 616 is utilized to mount the chassis 602 and the cable bracket 604 to hold the plurality of optical fibre cables.

Figure 11:
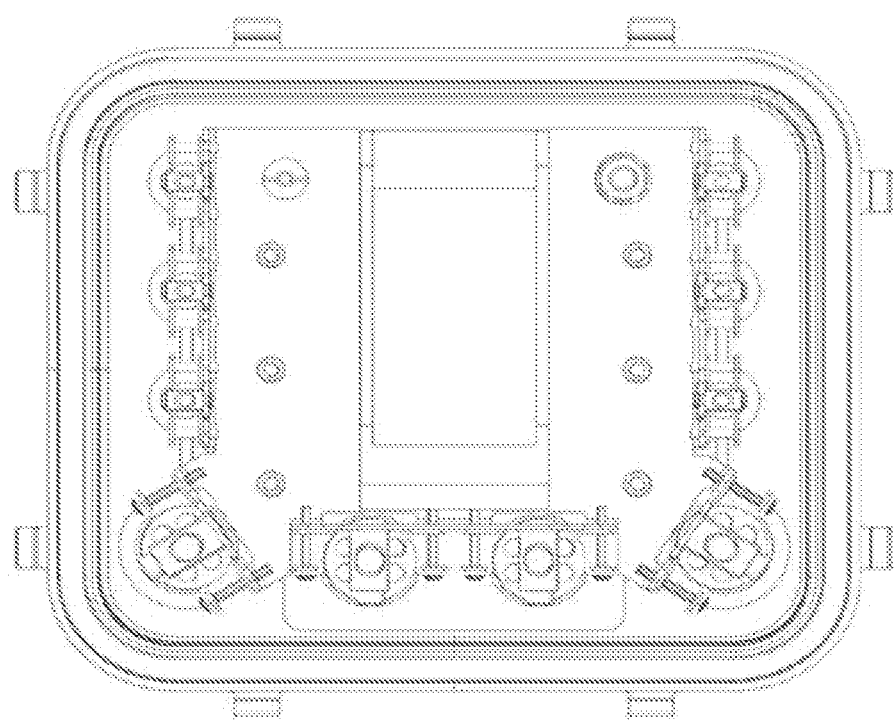
FIG. 11 illustrates a bottom view of the port assembly of the optical fibre joint enclosure of FIG. 1, in accordance with an embodiment of the present disclosure.
Figure 12:
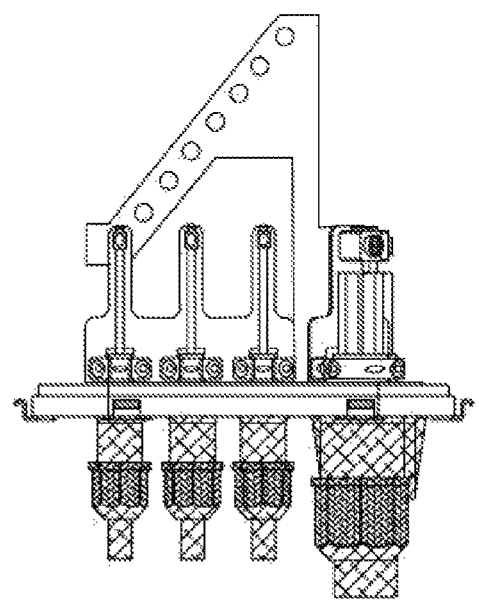
FIG. 12, FIG. 13, FIG. 14, FIG. 15, FIG. 16, FIG. 17, FIG. 18, FIG. 19, FIG. 20, FIG. 21, FIG. 22, FIG. 23, FIG. 24, and FIG. 25 illustrates multiple components of the port assembly of the optical fibre joint enclosure of FIG. 1, in accordance with an embodiment of the present disclosure; and FIG. 26
Figure 13:
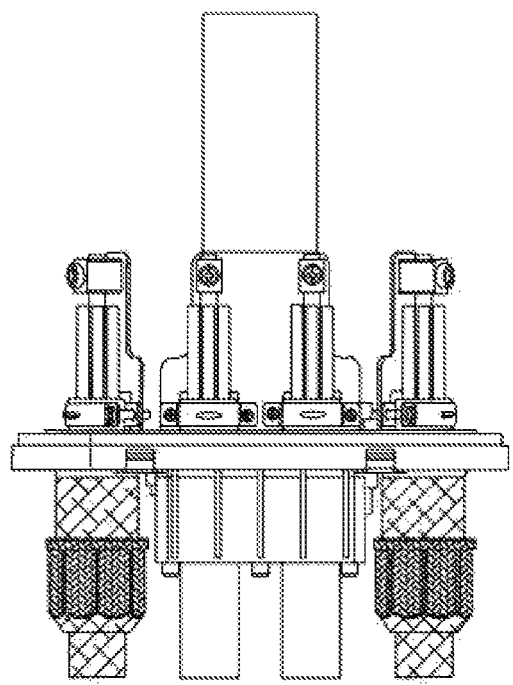

FIG. 11 illustrates a bottom view 900 of the port assembly 124 of the optical fibre joint enclosure 100 of FIG. 1, in accordance with an embodiment of the present disclosure.

FIG. 12, FIG. 13, FIG. 14, FIG. 15, FIG. 16, FIG. 17, FIG. 18, FIG. 19, FIG. 20, FIG. 21, FIG. 22, FIG. 23, FIG. 24, and FIG. 25 illustrates multiple components 1000 of port assembly 124 of the optical fibre joint enclosure 100 of FIG. 1, in accordance with an embodiment of the present disclosure.

Figure 14:
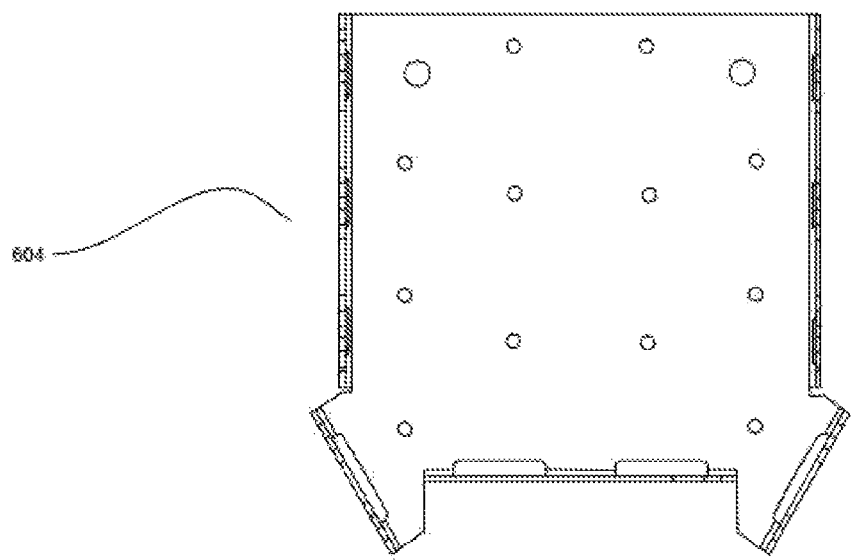
Figure 15:
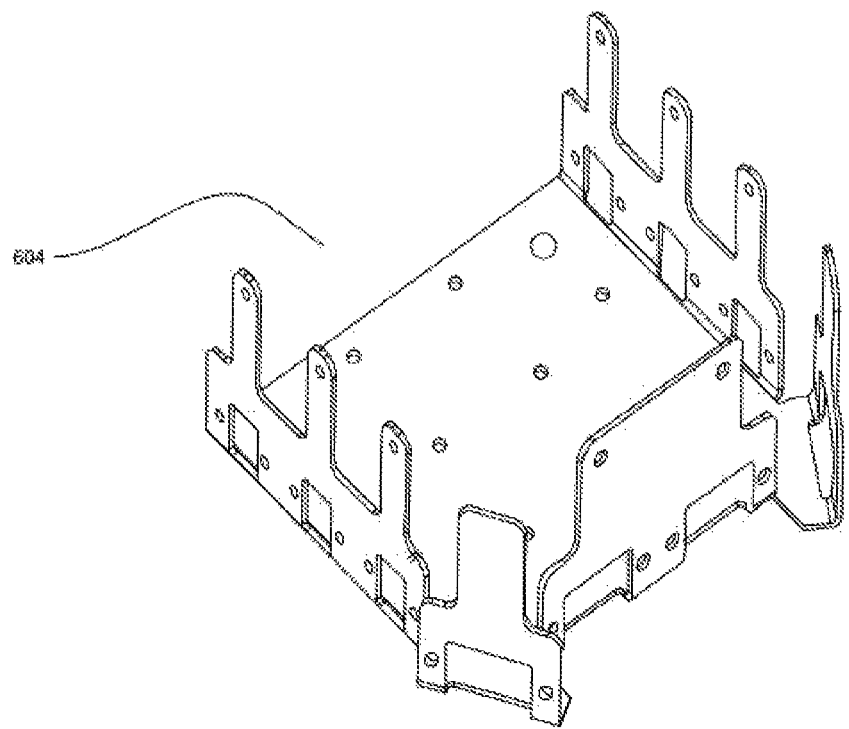
Figure 16:
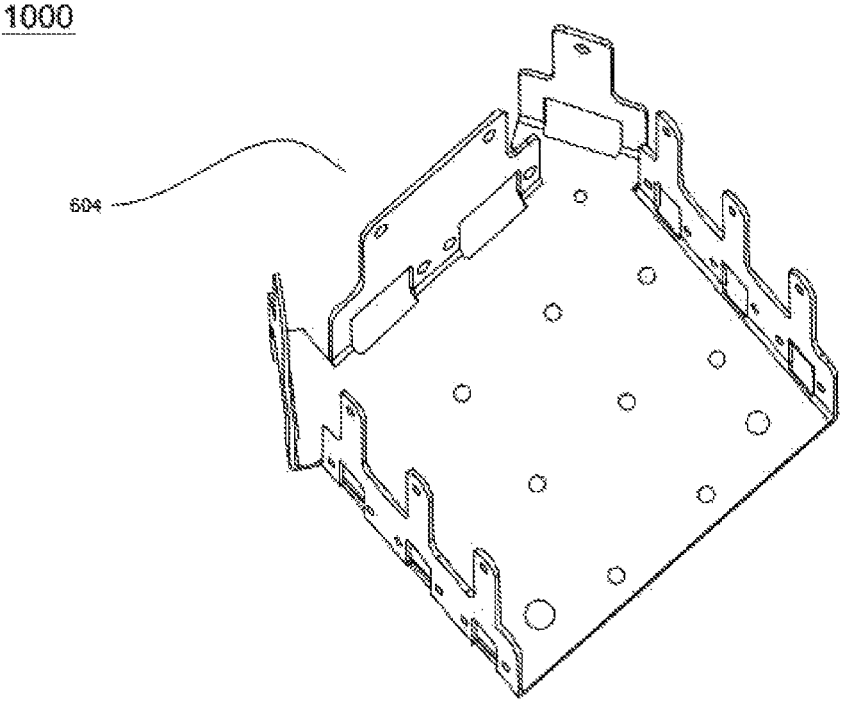

FIGS. 14, 15, and 16 illustrates cross-sectional view of the cable bracket 604 of the port assembly 124 of the optical fibre joint enclosure 100 (as explained above).

Figure 17:
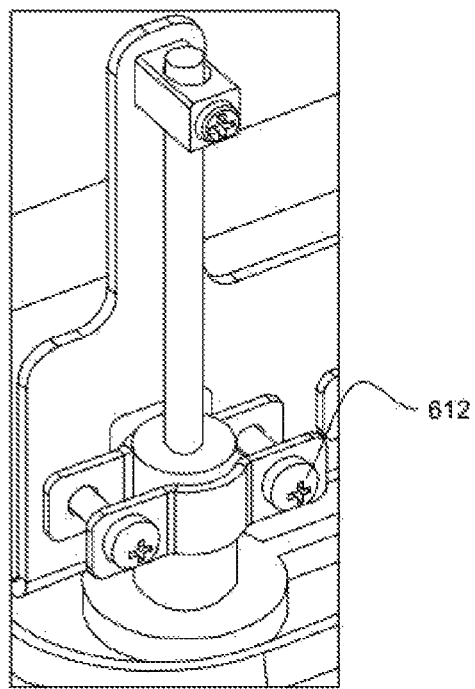
Figure 18:
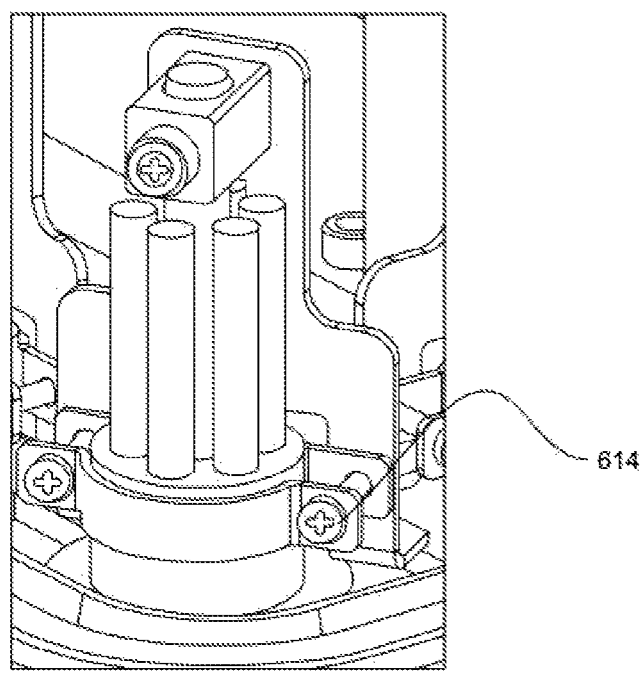
Figure 19:
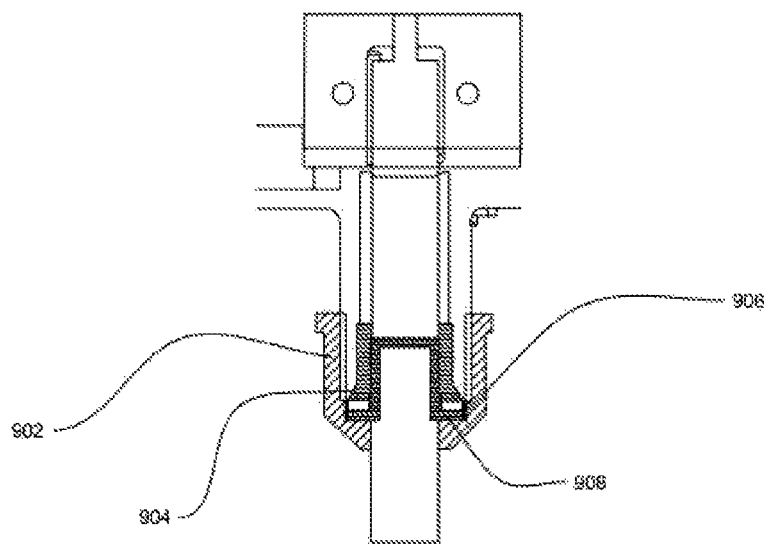

Furthermore, the port assembly 124 includes a small screw cable clamp 612 and a big screw cable clamp 614 (as shown in FIG. 17 and FIG. 18). The multiple components 1000 of the optical fibre joint enclosure 100 include nut plastic case 902, a rubber seal 904 a pressure plate 906 and a sealing cap 908 (as shown in FIG. 19).

Figure 20:
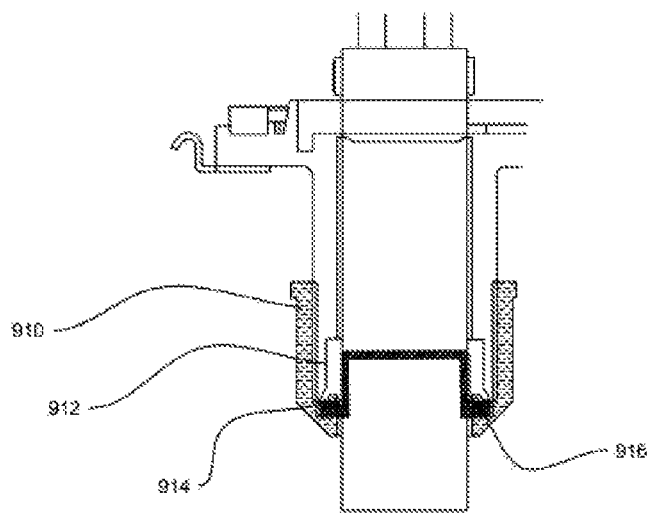
Figure 21:
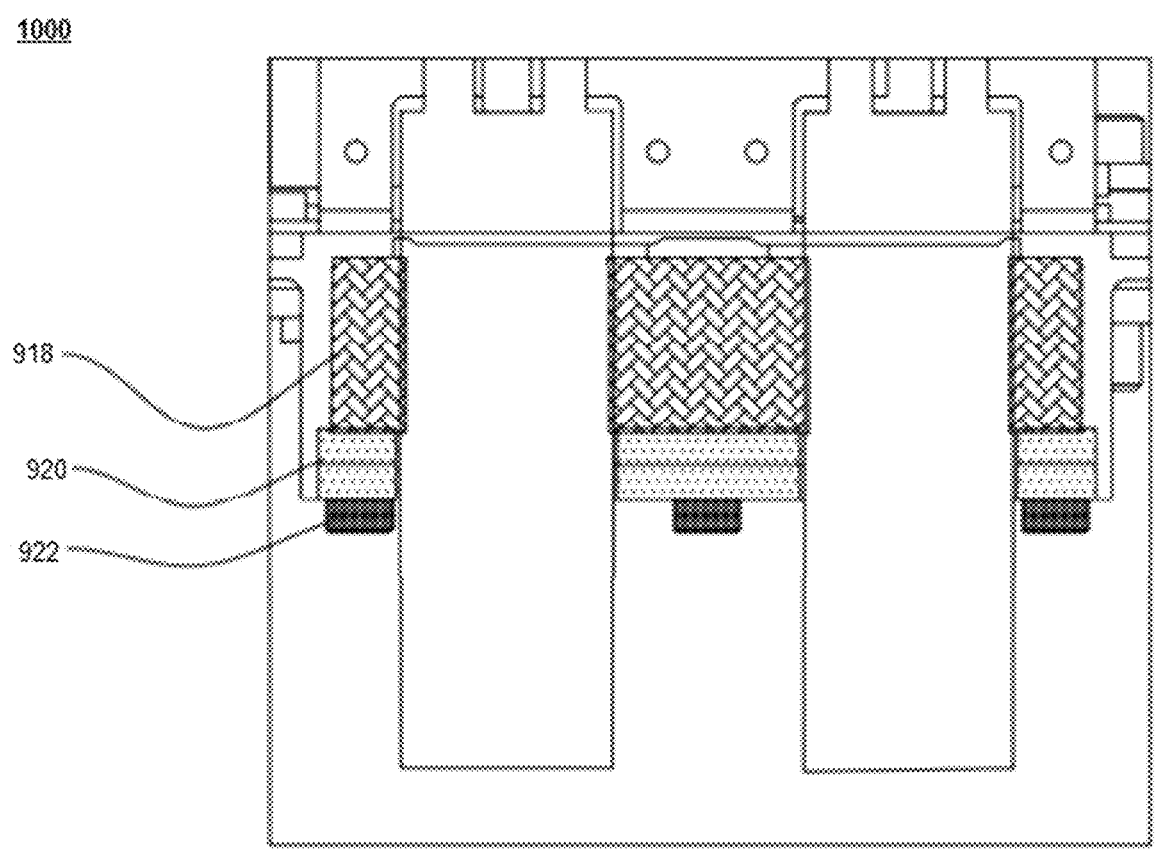
Figure 22:
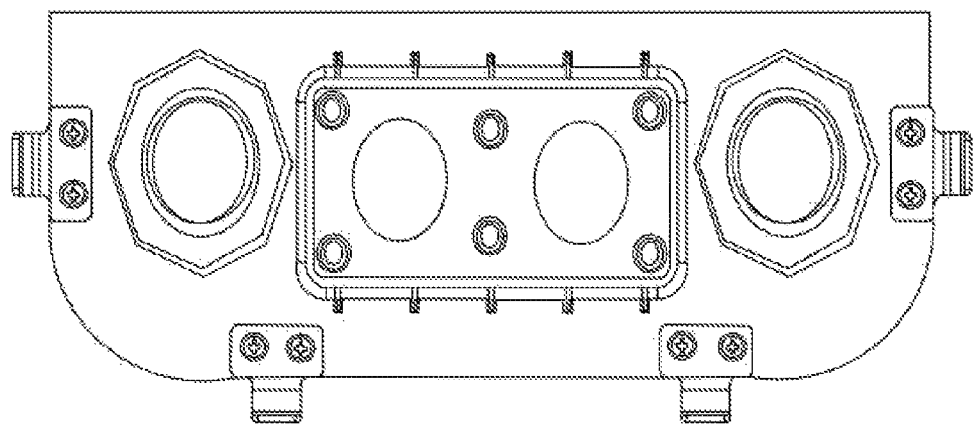
Figure 23:
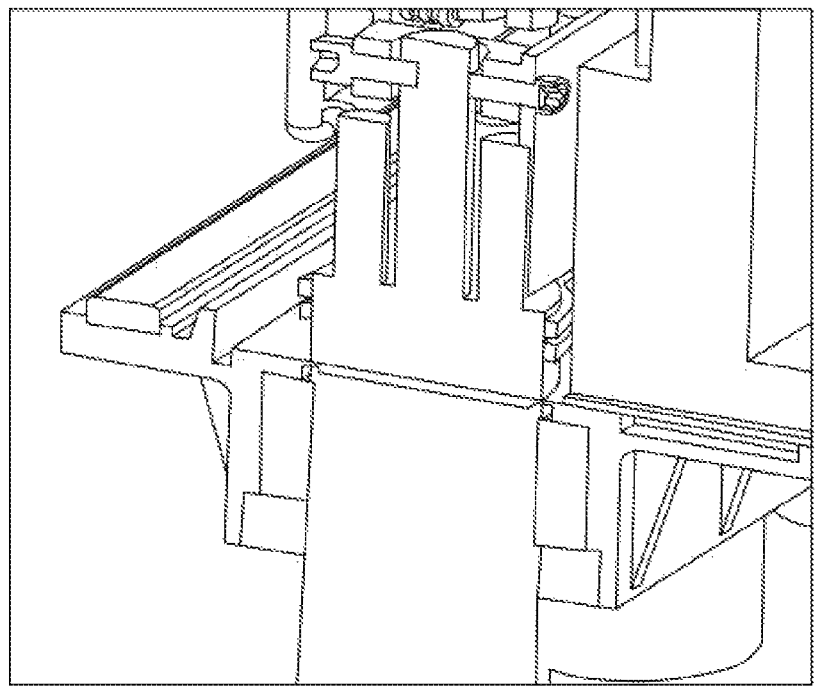
Figure 24:
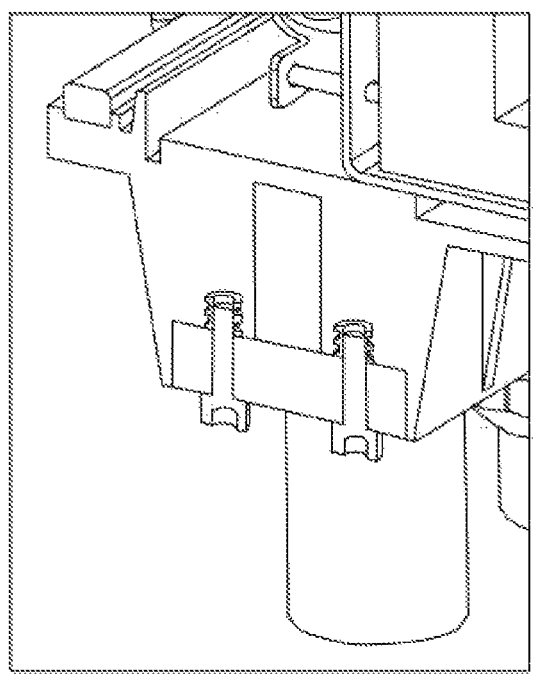

FIG. 20 illustrates cross sectional view of a section of the port assembly 124, in accordance with an embodiment of the present disclosure. The component includes a nut case 910, a seal 912, a plate 914, and a cap 916.

Figure 25:
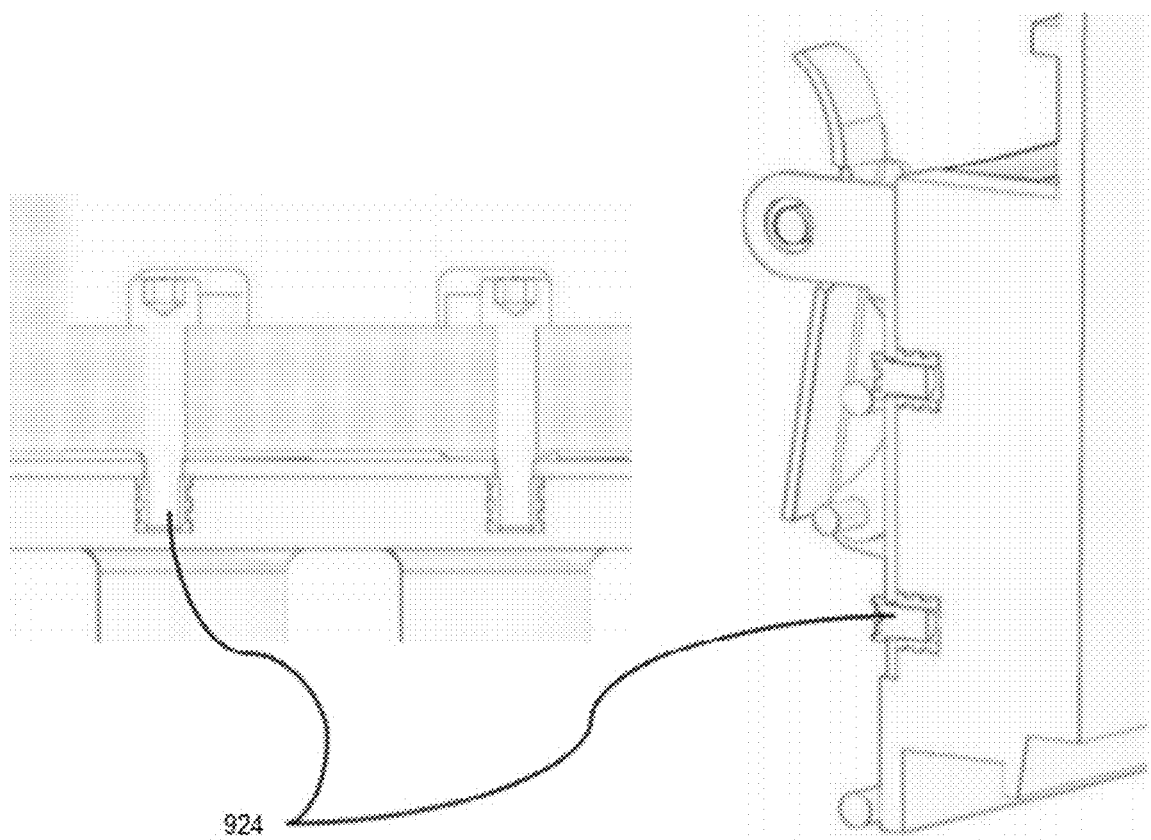

Further, the multiple components 900 include a mid span rubber 918, a mid span cap 920 and a socket 922 (as shown in FIGS. 21, 22, 23 and 24). Furthermore, the multiple components 900 include a brass insert 924 (as shown in FIG. 25).

Figure 26:
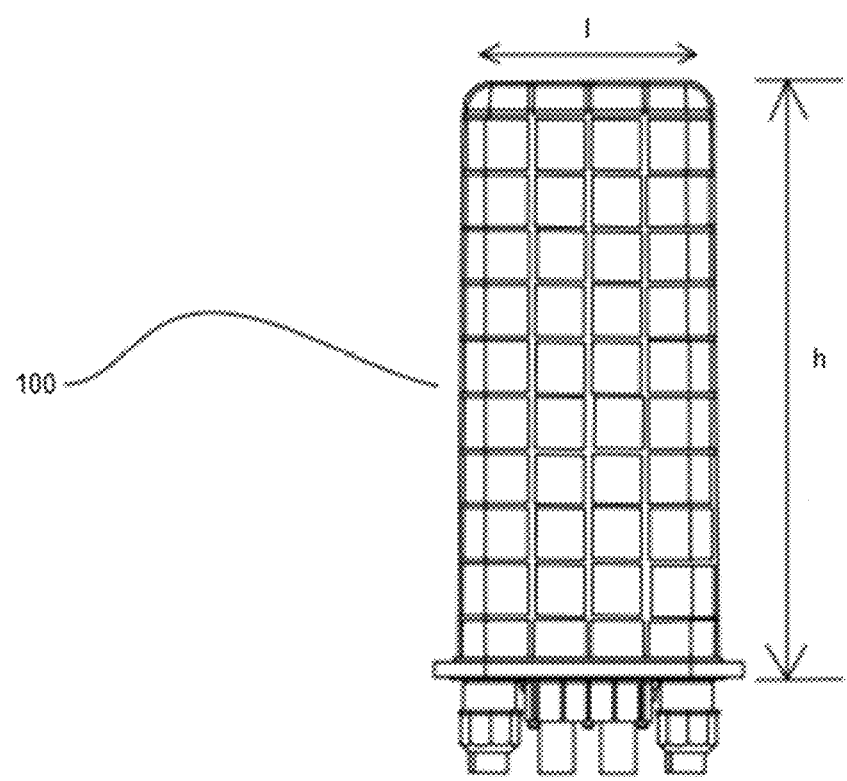
Figure 27:
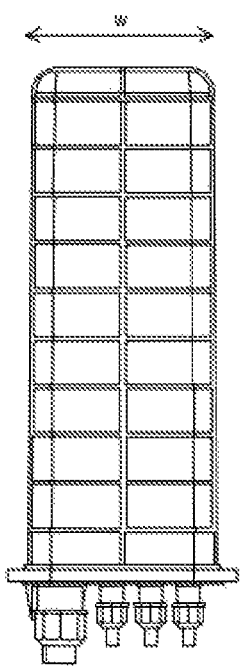
FIG. 27 illustrates side view the optical fibre joint enclosure of FIG. 1, in accordance with an embodiment of the present disclosure.

FIG. 26 and FIG. 27 illustrates side view 1100 the optical fibre joint enclosure 100 of FIG. 1, in accordance with an embodiment of the present disclosure. In an embodiment of the present disclosure, the optical fibre joint enclosure 100 is defined by a height (h) of 500 to 600 millimeters. In another embodiment of the present disclosure, the height (h) of the optical fibre joint enclosure 100 may vary. In an embodiment of the present disclosure, the optical fibre joint enclosure 100 is defined by a width w of 200 to 300 millimeters. In another embodiment of the present disclosure, the width w of the optical fibre joint enclosure 100 may vary. In an embodiment of the present disclosure of the present disclosure, length l of the optical fibre joint enclosure 100 is about 250 millimeter. In another embodiment of the present disclosure of the present disclosure, length l of the optical fibre joint enclosure 100 may vary.

The foregoing descriptions of specific embodiments of the present technology have been presented for purposes of illustration and description. They are not intended to be exhaustive or to limit the present technology to the precise forms disclosed, and obviously many modifications and variations are possible in light of the above teaching. The embodiments were chosen and described in order to best explain the principles of the present technology and its practical application, to thereby enable others skilled in the art to best utilize the present technology and various embodiments with various modifications as are suited to the particular use contemplated. It is understood that various omissions and substitutions of equivalents are contemplated as circumstance may suggest or render expedient, but such are intended to cover the application or implementation without departing from the spirit or scope of the claims of the present technology.

Although the present disclosure has been explained in relation to its preferred embodiment(s) as mentioned above, it is to be understood that many other possible modifications and variations can be made without departing from the spirit and scope of the inventive aspects of the present invention. It is, therefore, contemplated that the appended claim or claims will cover such modifications and variations that fall within the true scope of the invention.

We claim:

1. An optical fibre joint enclosure comprising:
   a base housing, wherein the base housing has one of a cubical and cuboidal shape;
   a dome cover mechanically engaged with the base housing, wherein the base housing and the dome cover forms compact high density enclosure; and
   a plurality of storage baskets, wherein the plurality of storage baskets are parallel to edges of the optical fibre joint enclosure such that the parallel arrangement makes U-shape inside the optical fibre joint enclosure, wherein the plurality of storage baskets comprises:
      a first basket and a second basket, wherein the first basket and the second basket are support structures to store a plurality of optical fibres; and
      a third basket, wherein the third basket lies at equidistant from the first basket and the second basket such that the first basket, the second basket and the third basket are arranged inside the optical fibre joint enclosure in an inline manner with a plurality of ports, wherein the third basket is positioned in middle of the first basket and the second basket.

2. The optical fibre joint enclosure as claimed in claim 1, wherein the first basket is positioned perpendicular to the base housing and parallel to a central axis of the optical fibre joint enclosure, wherein the second basket is positioned perpendicular to the base housing and parallel to the central axis of the optical fibre joint enclosure, wherein the second basket is positioned on an opposite side to the first basket, and wherein the third basket is a mid-span basket, wherein the third basket is positioned perpendicular to the base housing and parallel to the central axis of the optical fibre joint enclosure, wherein the first basket, the second basket and the third basket are parallel to edges of the optical fibre joint enclosure.

3. The optical fibre joint enclosure as claimed in claim 1 further comprising a plurality of splice trays.

4. The optical fibre joint enclosure as claimed in claim 1 further comprising a plurality of splice trays, wherein each of the plurality of splice trays is mounted on a mounting tray, wherein each of the plurality of splice trays comprising a splice holder cover and a plurality of splice holder slots.

5. The optical fibre joint enclosure as claimed in claim 1 further comprising a latch, a metal lock wire, a lock, and a port assembly, wherein the latch connects the dome cover with the port assembly, wherein the metal lock wire and the lock are utilized for locking the dome cover with the port assembly.

6. The optical fibre joint enclosure as claimed in claim 1 further comprising a port assembly, wherein the port assembly comprising the plurality of ports, wherein the plurality of ports comprising at least one of:
   a plurality of drop cable ports, wherein the plurality of drop cable ports is utilized to connect one or more secondary optical fibre cables with the optical fibre joint enclosure;
   a plurality of primary ports, wherein the plurality of primary ports is utilized for connecting a first primary optical fibre cable with the optical fibre joint enclosure, wherein number of the plurality of primary ports is 2;
   a mid span port, wherein the mid span port is utilized for connecting one or more second primary optical fibre cables with the optical fibre joint enclosure;
   an earthing port, wherein the earthing port is utilized for connecting earth wire with the optical fibre joint enclosure; and
   an air valve, wherein the air valve facilitates air circulation in the optical fibre joint enclosure.

7. The optical fibre joint enclosure as claimed in claim 1 further comprising
   a plurality of drop cable ports, wherein number of the plurality of drop cable ports is 6;
   wherein the plurality of storage baskets has capacity to store 1152 optical fibres; and
   wherein the optical fibre joint enclosure has splicing capacity of 2592 splices.

8. The optical fibre joint enclosure as claimed in claim 1, wherein the optical fibre joint enclosure is defined by a height of 500 to 600 millimeters and a width of 200 to 300 millimeters.

9. An optical fibre joint enclosure comprising:
   a plurality of storage baskets, wherein each of the plurality of storage baskets is positioned inside a dome cover, wherein the plurality of storage baskets comprising:
      a first basket, wherein the first basket is positioned perpendicular to a base housing and parallel to a central axis of the optical fibre joint enclosure, wherein the first basket is a support structure to store a plurality of optical fibres;
      a second basket, wherein the second basket is positioned perpendicular to the base housing and parallel to the central axis of the optical fibre joint enclosure, wherein the second basket is positioned on an opposite side to the first basket, wherein the second basket is a support structure to store the plurality of optical fibres; and a third basket, wherein the third basket is a mid-span basket, wherein the third basket is positioned perpendicular to the base housing and parallel to the central axis of the optical fibre joint enclosure, wherein the third basket is positioned in middle of the first basket and the second basket, wherein the first basket, the second basket and the third basket are parallel to edges of the optical fibre joint enclosure such that the parallel arrangement of the first basket, the second basket and the third basket makes U-shape inside the optical fibre joint enclosure, wherein the third basket lies at equidistant from the first basket and the second basket such that the first basket, the second basket and the third basket are arranged inside the optical fibre joint enclosure in an inline manner with a plurality of ports.

10. The optical fibre joint enclosure as claimed in claim 9 further comprising the base housing, wherein the base housing has one of a cubical and cuboidal shape.

11. The optical fibre joint enclosure as claimed in claim 9 further comprising a dome cover mechanically engaged with the base housing, wherein the dome cover is a lid of the optical fibre joint enclosure, wherein the dome cover protects internal assembly of the optical fibre joint enclosure, wherein the base housing and the dome cover forms compact high density enclosure.

12. The optical fibre joint enclosure as claimed in claim 9, wherein the optical fibre joint enclosure has a rectangular shape, wherein the optical fibre joint enclosure is a compact high density enclosure.

13. The optical fibre joint enclosure as claimed in claim 9 further comprising a plurality of splice trays, wherein each of the plurality of splice trays is fixed inside the optical fibre joint enclosure.

14. The optical fibre joint enclosure as claimed in claim 9 further comprising a plurality of splice trays, wherein each of the plurality of splice trays is mounted on a mounting tray, wherein each of the plurality of splice trays comprising a splice holder cover and a plurality of splice holder slots.

15. The optical fibre joint enclosure as claimed in claim 9 further comprising a latch, a metal lock wire, a lock, and a port assembly, wherein the latch connects the dome cover with the port assembly, wherein the metal lock wire and the lock are utilized for locking the dome cover with the port assembly.

16. The optical fibre joint enclosure as claimed in claim 9 further comprising a port assembly, wherein the port assembly comprising the plurality of ports, wherein the plurality of ports comprising at least one of:
- a plurality of drop cable ports, wherein the plurality of drop cable ports is utilized to connect one or more secondary optical fibre cables with the optical fibre joint enclosure;
- a plurality of primary ports, wherein the plurality of primary ports is utilized for connecting a first primary optical fibre cable with the optical fibre joint enclosure, wherein number of the plurality of primary ports is 2;
- a mid span port, wherein the mid span port is utilized for connecting one or more second primary optical fibre cables with the optical fibre joint enclosure;
- an earthing port, wherein the earthing port is utilized for connecting earth wire with the optical fibre joint enclosure; and
- an air valve, wherein the air valve facilitates air circulation in the optical fibre joint enclosure.

17. The optical fibre joint enclosure as claimed in claim 9 further comprising at least one of:
- a plurality of drop cable ports, wherein number of the plurality of drop cable ports is 6;
- wherein the plurality of storage baskets has capacity to store 1152 optical fibres; and
- wherein the optical fibre joint enclosure has splicing capacity of 2592 splices.

18. The optical fibre joint enclosure as claimed in claim 9, wherein the optical fibre joint enclosure is defined by a height of 500 to 600 millimeters and a width of 200 to 300 millimeters.

* * * * *